Dec. 22, 1964   J. M. CUNNIEN   3,162,849
TWO POSITION VISUAL DISPLAY INDICATOR
Filed May 10, 1961
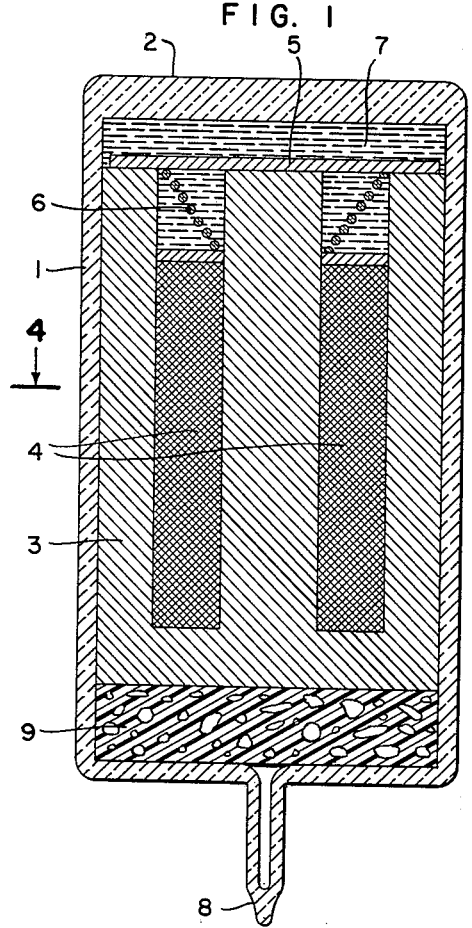
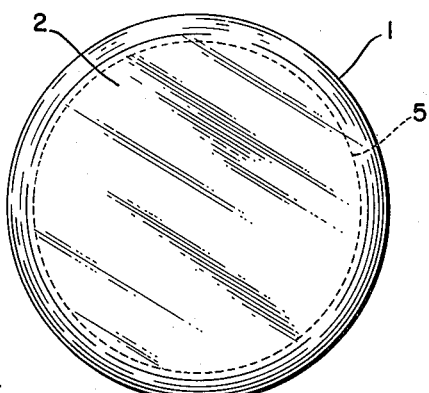
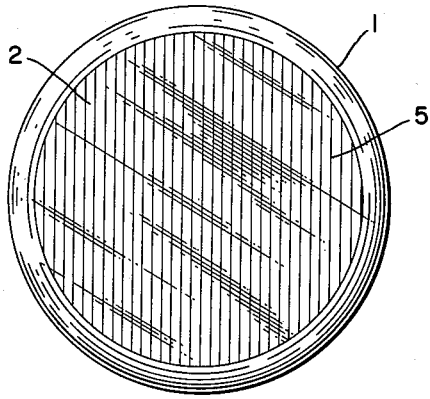
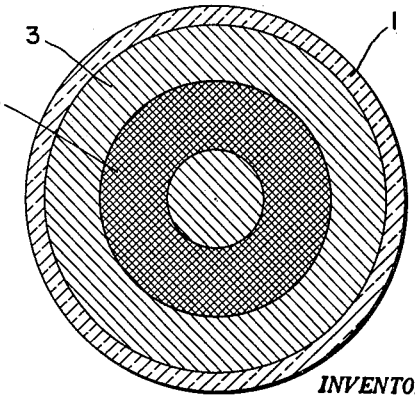
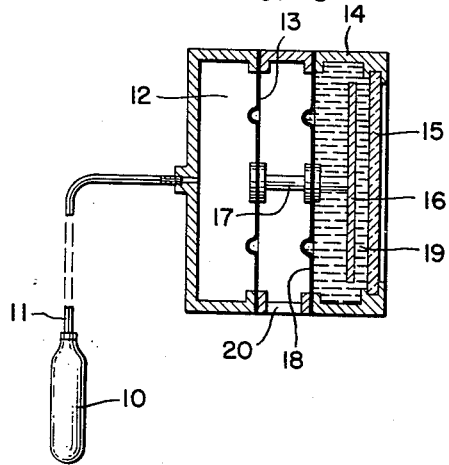
INVENTOR.
JAMES M. CUNNIEN
BY *Arthur H. Swanson*
ATTORNEY.

3,162,849
TWO POSITION VISUAL DISPLAY INDICATOR
James M. Cunnien, Manchester, N.H., assignor to Honeywell Inc., a corporation of Delaware
Filed May 10, 1961, Ser. No. 109,060
1 Claim. (Cl. 340—373)

A general object of the present invention is to provide an improved instrument of the type providing but two condition indications and having particular utility as a warning or alarm indicator.

Small indicators for signalling "on" and "off" or other predetermined conditions have long been utilized to provide simplified signalling of pressure, temperature, and other variables. Such devices are particularly useful as warning or alarm indicators. Of recent years they have become of increased interest for use as indicators where simplified panel presentations are desirable to minimize the difficulties in observing the scanning of numerous complex panel instruments.

Frequently, a visual indication is desired as to whether a low-power electrical circuit is actually consuming power and operating in a normal manner or because of a malfunction or for some other reason is operating abnormally and is, for example, in an "off" state. Forms of indicators, such as meters having moving coil systems, have been proposed for use as low-power level output indicators, but such structures are relatively fragile in operation, are costly to provide, and have mov-pivoted parts which are subject to wear.

Accordingly, a specific object of the present invention is to provide an improved indicator which signals by means of providing a distinctive display in response to a small change in a physical quantity such as an electrical current, a fluid pressure, mechanical motion, etc.

Another object of the invention is to provide such an improved indicator which is inexpensive to construct, has an extremely long life, and occupies only a small space on a panel.

Another object of the invention is to provide an improved indicator which gives a distinctive display in response to the flow of extremely small electrical currents, for example, in the microampere range.

A further object of the invention is to provide an improved indicator which gives a distinctive display in response to a mechanical motion resulting from a small change in a fluid or other pressure or force.

A better understanding of the present invention may be had from the following detailed description when read in connection with the accompanying drawings, in which:

FIG. 1 is a side plan view of a preferred embodiment of the invention for providing a distinctive display in response to the flow of a minute electrical current;

FIGS. 2 and 3 are front pictorial views of the indicator of FIG. 1;

FIG. 4 is a section on lines 4—4 of FIG. 1; and

FIG. 5 is a side plan view of a modified form of the invention for providing a distinctive display in response to a small mechanical motion produced in response to a fluid pressure change.

Referring now to FIG. 1 of the drawing, the indicator of the present invention comprises a sealed, cylindrical casing 1 in the front end of which lens 2 is provided. The casing 1, in the preferred embodiment illustrated, contains an electro-magnet comprising an E-shaped soft iron core member 3 over the central leg of which a coil 4 is wound. As shown, the open end of the E-shaped member is spaced slightly from the inner surface of the lens 2 providing a space in which a soft iron armature or disc 5 is disposed. A helical armature loading spring 6 is fitted over the central leg of the core 3 between the coil 4 and the armature 5 and serves to hold the armature 5 flush against the inner face of the lens 2 when the coil 4 is de-energized.

The space within the sealed casing 1 not occupied by the assembly consisting of members 2 through 6, is filled with a brightly colored liquid 7 of low viscosity and preferably selected to have a specific gravity of the same order as that of the disc 5 to buoy up the latter and to give it the effect of no weight. A fill tube 8 is provided, as shown, for facilitating the filling of the casing 1, with the liquid 7. Desirably, closed cell plastic sponge 9 is provided between the lower end of the casing 1, as seen in FIG. 1, and the E-shaped magnetic member 3.

In accordance with the present invention, the surface of the disc 5 facing the inner surface of the lens 2 is selected to have a color different from that of the liquid 7. Consequently, upon energization of the coil 4 and attraction of the disc away from the inner surface of the lens 2, the color of the fluid 7 will show through the lens.

FIG. 1 of the drawing shows the indicator in the energized position with the disc-like member 5 against the pole faces of the E-shaped member 3. The opaque fluid 7 fills the space between the lens 2 and the disc 5 and the color then seen through the lens is that of the fluid 7. Upon de-energization of the coil 4, the spring 6 forces the disc 5 away from the magnet poles and against the inside surface of the lens. This displaces the fluid 7, and the color then seen through the lens is that of the disc. The surface of the disc 5, as noted, is selected to contrast with the color of the fluid. If desired the disc may carry a word display that would become visible when the coil 4 is de-energized and the fluid is displaced.

FIG. 2 shows the distinctive display provided by the indicator of FIG. 1 when the coil 4 is energized. FIG. 3 shows the contrasting color displayed by the indicator upon de-energization of the coil 4.

The indicator illustrated in the modification of FIG. 5 is operative to provide a distinctive display in response to a change in fluid pressure within a fluid pressure system. This system comprises a temperature sensitive bulb 10, a capillary connecting tube 11 and a pressure sensitive capsule 12 having a movable diaphragm 13. Capsule 12, as shown, is contained within a casing 14 provided at its front end with a lens 15. Spaced slightly from the inner surface of the lens 15 is an opaque disc-like member 16 which is rigidly attached to the movable diaphragm 13 by a rod 17. As shown, the rod 17 extends in a sealed manner through a diaphragm 18 which is sealed at its outer edges to the casing 14. The space enclosed by the diaphragm 18 and lens 15 and containing disc 16 is filled with a brightly colored opaque liquid 19. If desired, the liquid 19 may be similar to the liquid 7 of FIG. 1. If necessary, the space between the diaphragms 13 and 18 can be in communication with the atmosphere by an opening 20 for facilitating the displacement of the liquid 19 as the disc 16 is urged toward or away from the inner surface of the lens 15.

FIG. 5 shows the indicator in a low-fluid pressure position of the fluid pressure system. In this position the opaque liquid 19 fills the space between the disc 16 and the lens 15, and the color then seen through the lens is that of the liquid. Upon an increase in fluid pressure in the fluid pressure system beyond a predetermined value, as upon a given increase in temperature to which the bulb 10 is subjected, the diaphragm 13 urges the rod 7, the central portion of diaphragm 18, and the disc 16 toward the right until the surface of the latter engages the inner surface of the lens 15. This displaces the fluid 19 and the color then seen through the lens is the surface of the disc 16.

Thus it may be seen that the indicator of the present invention is rugged in its construction, can be made in extremely small sizes, and provides a distinctive change in color upon a slight movement of a disc-like member whether in response to the flow of an electrical current through the energizing coil or to a change in pressure in a fluid pressure system. It will be apparent that the illustrated structure of FIG. 1 is one which, according to known electrical techniques can be made to respond to extremely small electrical current flows, for example, currents in the micro-ampere range. If desired, however, the indicator illustrated in FIG. 1 can be so constructed as to respond to electrical current flows of greater magnitude. It will be apparent also that the indicator illustrated in FIG. 5, by suitable modification, can be made to provide a distinctive color change in response to a predetermined change in the differences of two pressures, for example, or in response to the physical changes in other variables which can be made to urge the disc 19 into engagement with or away from the inner surface of the lens 15.

What is claimed is:

A low power indicator comprising a casing having a display portion, a brightly colored liquid in said casing, a magnetic member having a first position in which said liquid separates said member from said display portion and in which said liquid is visible through the latter, and a second position in which said member displaces said liquid from between said display portion and said member and precludes said liquid from being visible through said display portion, the specific gravity of said magnetic member being approximately the same as that of said liquid whereby said liquid buoys up said magnetic member and gives the latter the effect of no weight, means biasing said magnetic member into one of its said positions, and electromagnetic means operative when energized to move said magnetic member from one of its said positions to the other of its said positions.

References Cited in the file of this patent

UNITED STATES PATENTS

| | | |
|---|---|---|
| 1,464,894 | Webb | Aug. 14, 1923 |
| 2,410,636 | Cress | Nov. 5, 1946 |
| 2,866,186 | Hardesty | Dec. 23, 1958 |

FOREIGN PATENTS

| | | |
|---|---|---|
| 873,961 | Germany | Apr. 20, 1953 |